July 28, 1959 G. E. HANSEN 2,896,851
THERMAL CONTROL DEVICE FOR CONTAINER
Filed Nov. 25, 1957
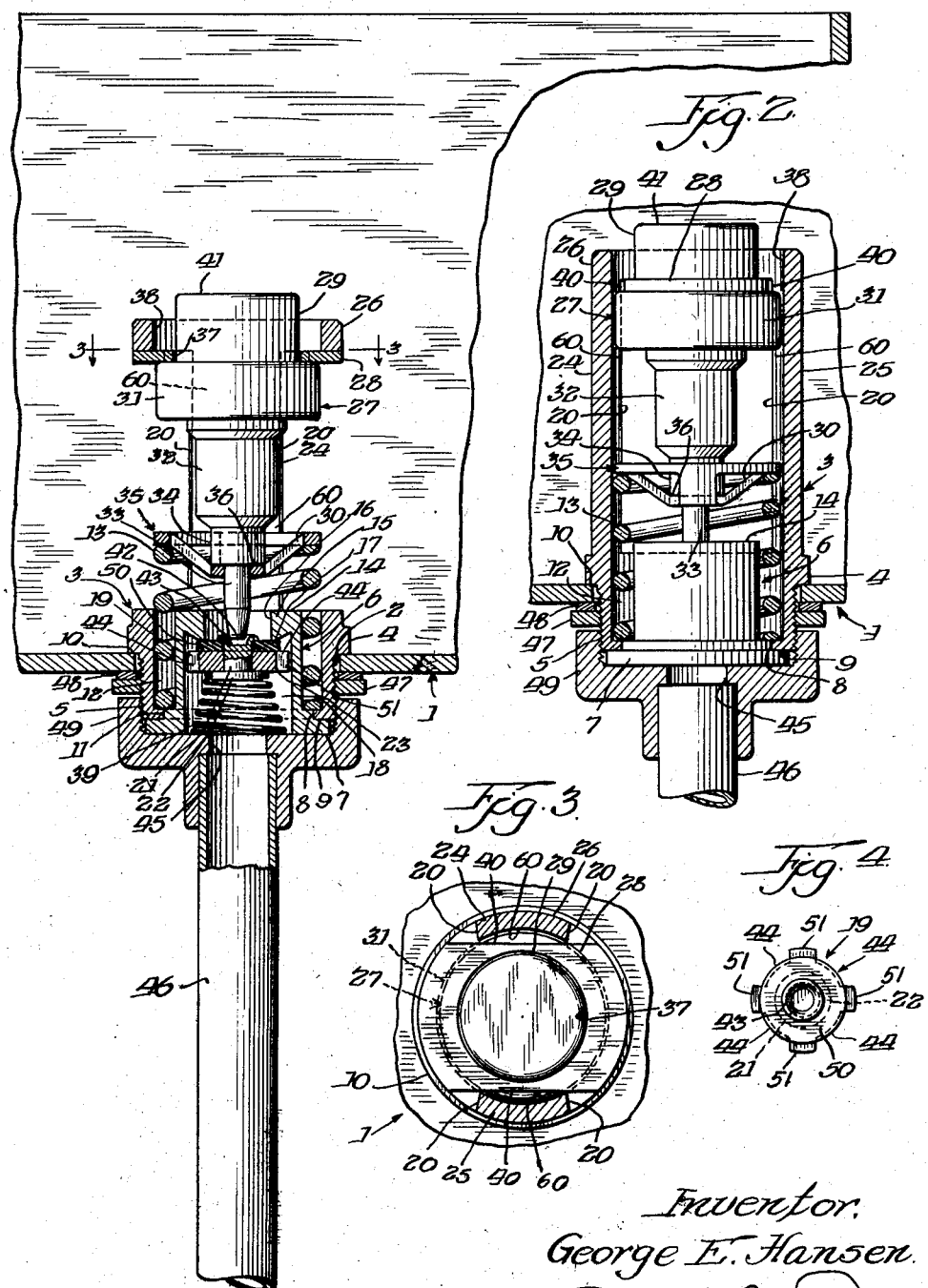
Inventor,
George E. Hansen.
By Joseph O. Range
Atty.

United States Patent Office 2,896,851
Patented July 28, 1959

2,896,851

THERMAL CONTROL DEVICE FOR CONTAINER

George E. Hansen, Elmwood Park, Ill., assignor to Crane Co., Chicago, Ill., a corporation of Illinois Application November 25, 1957, Serial No. 698,594

5 Claims. (Cl. 236—93)

This invention relates generally to a thermal control device. More particularly, it relates to a thermostatic relief valve useful for installation in combination with a container, tank or the like.

In order to acquire a better understanding of this invention, it should be understood at the outset that the cases are numerous in which protective means must be provided to allow for relief of fluid pressure within a vessel at predetermined excessive temperatures. For example, it has been found desirable to provide for such means in connection with coffee urns and like portable vessels in addition to those of a stationary type, such as boilers, storage tanks, and similar large vessels. Further, it is desirable in many instances to provide a construction in which the thermal control device is designed to permit intimate association with the vessel contents in order to effect greater accuracy and sensitivity in response.

It is therefore one of the more important objects of this invention to provide a durable and economical means for controlling the flow or discharge of liquids at predetermined desired temperatures.

Another object is to provide for a fluid relief construction which lends itself to comparatively simple and convenient installation and without incurrence of expensive premachining operations.

Another object is to provide for a thermal control device in which easy disassembly for inspection, repair or replacement of the device may be readily accomplished.

Other objects and advantages of my invention will become more apparent upon proceeding with a reading of the specification in light of the accompanying drawings, in which—

Fig. 1 is a fragmentary sectional view of an assembly showing a preferred structure embodying my invention.

Fig. 2 is a fragmentary sectional assembly view taken substantially at right angles to the view described in connection with Fig. 1.

Fig. 3 is a transverse sectional fragmentary view taken on the line 3—3 of Fig. 1.

Fig. 4 is a plan view of the closure member.

Similar reference numerals refer to similar parts throughout the several views.

Referring now to Fig. 1, a container tank or other vessel is generally designated 1 and is provided with the lower aperture 2 extending through the wall thereof for the purpose of receiving the thermally actuated relief valve of my invention.

The latter valve member consists essentially of a threaded body generally designated 3 which comprises a preferably polygonally shaped shoulder portion 4 and having the threaded shank 5 as indicated projecting through the tank aperture 2. Mounted within the body 3 in telescoped relation is a flanged sleeve member generally designated 6 of inverted cup-shaped configuration and having an outwardly projecting lower flange portion 7 snugly received within the aperture 8 of the body or casing 3 to bear against the undersurface 9 of the said body as indicated. Preferably, it is provided with an inner shoulder or stepped portion 11 which is received relatively snugly within the aperture 8. The shoulder 11 is of a thickness substantially equal to the length of the aperture 8 to provide between the said body and the sleeve an annular chamber 12 having an annular base for jointly supporting the coil spring 13. At the upper end portion 14, the sleeve member 6 is provided with the inturned flange 15 which is ported as at 16 and provided at the innermost portion of said latter flange with an annular seat 17. For firmly securing and mounting the body member 3 within the vessel, the body is shouldered as at 10 against an inner surface of the said vessel as illustrated.

At the upper end portion of the sleeve 6 and in communication with the aperture 16 a chamber 18 is provided, within which a reciprocally movable closure member generally designated 19 is received. The said closure member preferably consists of a rivet or other attaching means 21 having a head 22 bearing against the carrying flange 23 upon which latter member the rubber or suitable composition disc is supported, as shown. On the periphery of said flange, the guides 51 are arranged in annularly spaced relation as shown more clearly in Fig. 4 so as to accurately maintain the closure member in central position in the course of its reciprocating movement in the chamber 18 when the valve is opened or closed as hereinafter described, as well as to permit fluid flow therepast when the closure disc 50 is moved from its normal seat contact at 17, the flow occurring over and around the closure member.

As more clearly shown in Figs. 2 and 3, and in order to permit fluid flow therethrough the body 3 is provided with a transverse opening forming the oppositely disposed arcuate walls 24 and 25 in spaced apart relation. These walls are connected at their upper end portion by means of an annular integral collar portion 26. Within the space between walls 24 and 25 the thermostatically responsive device generally designated 27 is mounted being insertable through the collar opening 38 at the top of the body, as hereinafter described at greater length. A washer 28 with flattened or parallel extending sides 40, 40 is fitted around the upper cylindrical portion 29 of the thermally responsive device 27. The latter device is of the type generally identified by the trademark "Vernatherm" made and sold by Detroit Lubricator Company, Detroit, Michigan, and as indicated, it consists of an expanded central portion 31 and an attaching collar 32 with a depending stem or actuating plunger 33 integral therewith. An intermediate portion 34 is shouldered against the spring washer generally designated 35, ported for flow therepast at 30 and having the upper surface 36 to receive the said enlarged portion 34 of the thermally responsive device 27. Upon exposure of the portion 31, the attaching collar 32 and the stem 33 to predetermined high temperatures the thermostatic device will exand longitudinally to thereby cause said stem to make contact at the base of the recess 43 and lift the closure 19 from the seat 17.

As indicated, at the upper portion of the member 3, the washer 28 apertured as at 37 receives the upper part 29 of the thermostatic device 27, the member 3 being open as at 38 to allow for the projection of the portion 29 as indicated. As to its manner of engagement, it will be understood as more clearly shown in Fig. 3, that in installing the thermostatic device 27 and subsequent to moving it initially through the aperture 38, it is necessary that the device be moved downwardly against the resilient resistance offered by the coil springs 13 and the closure member supporting spring 39 sufficiently to allow the washer 28 during such assembly to be moved transversely across the top of the upper surface 41 sufficiently to permit it to assume the central position shown in Fig. 3. Upon such washer position being obtained, the said downward force against the springs is withdrawn and the thermostatic portion 29 then enters the aperture 37 of the washer 28 thus permitting the portion 29 to project therethrough and assume the position shown in Fig. 1. The oppositely disposed arcuate surfaces 60 as shown more clearly in Figs. 2 and 3 aid materially in stabilizing and centering the positioning of said thermostatic device with relation to the closure member, body and sleeve, and constitute preferably a continuation of the upper inner wall surface 38.

The lower end portion of the depending actuating plunger or stem 33 in the above described shouldered position of the thermostatic device 27, as indicated in Fig. 1, will allow for the valve closure member 19 to take the seated position shown in said figure. In the latter position, the end 42 of the stem while preferably received within the recess 43 permits of a clearance to be provided between the end of the stem and the inner end surface of the recess 43 as shown. This construction is desirable for two reasons, first, it assures of the valve being properly seated in its normal position, and, second, it allows for a slight impact or hammerblow to be imparted to the closure member portion 21 within the recess 43 upon sudden expansion of the thermostatic responsive device taking place to unseat said closure upon rapid occurrence of an excessive temperature condition. Under certain conditions of operation, the structure is desirable, in such installations where the opening 16 and the seat 17 may become coated with sedimentary deposits or foreign matter tending to otherwise hold the valve closure member firmly against the expansive movement of the thermostatic device 27 when the stem end 42 bears against the base of the recess 42 in said unseating of the closure member 19. Annularly spaced areas 44 between the guides 51 allow for the fluid flow past the closure 19, as indicated more clearly in Fig. 4.

It will be appreciated, of course, that upon the occurrence of such expansion of the thermostatic device the unseating of the closure member 19 will then take place, and discharging fluid will pass through the opening 16, past the valve seat 17, between the guides 51 of the closure member 19 in said spaces designated 44, thence past the coil spring 39 and into the body discharge opening 45 into a suitable discharge conduit 46.

In attaching the body to the vessel, a threaded washer 47 preferably engages the threads 5 bearing against the sealing gasket 48 thereby to make a fluid sealing connection with the tank or container as indicated. A lower inverted bonnet 49 receives the body 3 and the flanged sleeve 6. It is threadedly mounted upon the body threads 5 as indicated, thus holding the inner flanged sleeve 6 in clamped assembled relation against the surface 9 of the body 3 as shown bearing against the surface 10 of the vessel 1. A desirable flexible assembly is thus assured between the body, the sleeve, and the bonnet.

It will also be apparent from the foregoing that a comparatively simple and inexpensive construction has been provided possessing easy means of installation and accessability for repair, replacement and adjustment or inspection.

It will further be clear that while only a single embodiment has been shown and described, the invention is capable of embodiment in other forms of construction without departing from the spirit of the invention as defined by the appended claims.

I claim:

1. In a thermostatic relief valve for mounting within a vessel such as a tank or the like, the combination of a valve body, a reciprocally movable closure member therefor normally seated within the body, a temperature responsive element cooperating with the said closure member to move the latter member predeterminately from its seat within said body upon predetermined expansion of said temperature responsive element, means for positioning the said temperature responsive element within the valve body, the latter positioning means including a sleeve member having axially aligned apertures, the said sleeve member adjacent the lower one of the aligned sleeve apertures having an outer flange portion for supporting the said temperature responsive element thereon, the said body having inwardly projecting means cooperating with said sleeve to align the latter member axially with said body, resilient means supported by the sleeve flange portion engaging a lower end limit of the temperature responsive element, the upper end portion of said body having an opening to permit the insertion and removal therethrough of said temperature responsive element vertically from said body opening, a transversely movable washer cooperating with the said temperature responsive element to overlie and retain said latter element within said body, the said body having oppositely disposed side openings for effecting the insertion and removal of the said washer transversely of the body member following predetermined compression of the said resilient means and predetermined axial movement of the said temperature responsive element in a direction toward the closure member seat.

2. In a thermostatic relief valve for mounting within a vessel such as a tank or the like, the combination of a valve body, a reciprocally movable closure member therefor normally seated within the body, a temperature responsive element cooperating with the said closure member to move the latter member predeterminately from its seat within said body upon predetermined expansion of said temperature responsive element, means for attaching the said temperature responsive element within the valve body, the latter attaching means including a sleeve member telescoped within the valve body and having aligned apertures of unlike size with a shoulder portion therebetween, the said sleeve member adjacent the lower limits of the larger one of the aligned sleeve apertures having an outer projection for supporting the said temperature responsive element thereon, the said closure member having guide means slidably engageable with the said sleeve, the said body having means cooperating with an outer portion of said sleeve to align the latter member axially with said body, resilient means supported by the sleeve flange portion engaging an undersurface portion of the temperature responsive element, the upper portion of said body having an end disposed opening to permit the insertion and removal therethrough of said temperature responsive element vertically from said body opening, a transversely movable washer cooperating with a shoulder portion of the body adjacent said end disposed opening to overlie and retain said temperature responsive element within said body, the said body having oppositely disposed side openings for effecting the insertion and removal of the said washer transversely of the body member predeterminately following compression of the said resilient means and axial movement of the said temperature responsive element in a direction toward the closure member seat.

3. In a thermostatic relief valve for a vessel interior such as a tank or the like, the combination of a valve body member, a reciprocally movable closure member therefor normally seated within the body member, a temperature responsive element resiliently mounted within the body member cooperating with the said closure member to move the latter member predeterminately from its seat within said body member upon predetermined expansion of said temperature responsive element, means for positioning the said temperature responsive element within the valve body member, the latter positioning means including a sleeve member having aligned longitudinally extending apertures, the said sleeve member adjacent its lower limit having an outer flange portion for supporting the said temperature responsive element thereon, the body member having means cooperating with said sleeve to align the latter member axially with said body member in annular spaced apart relation except for said sleeve flange portion, resilient means supported by the sleeve flange portion, the upper portion of said body member having an end opening to permit the insertion and removal of said temperature responsive element substantially axially from said body member, a transversely movable washer overlying the said temperature responsive element to retain said latter element within said body member, the said body member having oppositely disposed side openings for effecting the removal of the said washer transversely of the body member following predetermined axial movement of the said resiliently mounted temperature responsive element in a direction toward the closure member seat whereupon the said temperature responsive element is then freely removable from the said body member through said end opening.

4. In a thermostatic relief valve for a vessel interior such as in a tank or the like, the combination of a valve body with means for attachment to the tank, a reciprocally movable closure member therefor normally seated within the body, a temperature responsive element for actuating the said closure member predeterminately from its seat within said body upon predetermined expansion of said temperature responsive element, means for positioning the said temperature responsive element relative to the valve body, the latter means including a sleeve member having aligned longitudinally extending apertures, the said sleeve member adjacent the lower limits of the larger of unlike aligned sleeve apertures having means for supporting the said temperature responsive element and to align the said sleeve axially with said body, resilient means carried by the said sleeve to support the said temperature responsive element, the upper end portion of said body having an opening permitting the insertion and removal of said temperature responsive element from said body opening, a transversely movable washer cooperating with the said temperature responsive element to retain said latter element within said body member upon predetermined positioning of the said washer relative to the body opening, the said body member having oppositely disposed side openings for effecting the removal of the said washer transversely of the body member following predetermined compression of the said resilient means and predetermined axial movement of the said temperature responsive element in a direction toward the closure member seat, the body means for attachment to the tank having an outlet for fluid discharge from the tank.

5. In a thermostatic relief valve for a vessel interior such as a tank or the like, the combination of a valve body with an inlet and outlet and means at the outlet for attachment of the said body to the tank, a reciprocally movable resiliently mounted closure member therefor normally seated within the body, a temperature responsive element for moving the said closure member predeterminately from its seat within said body upon predetermined expansion of said temperature responsive element, means for positioning the said temperature responsive element relative to the valve body, the latter means including a sleeve member having aligned longitudinally extending apertures, the said sleeve member having a lower outer projecting portion for supporting the said temperature responsive element, the body having means cooperating with the projecting portion of the said sleeve to align the sleeve axially with said body in annularly spaced relation, resilient means within the annularly spaced portion to support the temperature responsive element, the upper portion of said body having an opening for the insertion and removal of said temperature responsive element from said body, a transversely movable washer normally bearing against the upper portion of the body adjacent the body opening to retain the said temperature responsive element within said body, the said body having transverse openings in a wall portion thereof for the insertion and removal of the said washer relative to the body member following predetermined compression of the said resilient means and predetermined axial movement of the said temperature responsive element in a direction toward the closure member seat, the said means for effecting the tank attachment of the body at the body outlet comprising a bonnet member receiving said sleeve member and having a passage in communication with the interior of said sleeve member.

References Cited in the file of this patent

UNITED STATES PATENTS

| | | |
|---|---|---|
| 1,403,655 | Tirrill | Jan. 17, 1922 |
| 2,657,859 | Von Wangenheim | Nov. 3, 1953 |